(12) United States Patent
Yoshioka et al.

(10) Patent No.: US 11,795,520 B2
(45) Date of Patent: Oct. 24, 2023

(54) HOT-PRESSED MEMBER, METHOD FOR MANUFACTURING THE SAME, AND METHOD FOR MANUFACTURING STEEL SHEET FOR HOT-PRESSED MEMBER

(71) Applicant: JFE STEEL CORPORATION, Tokyo (JP)

(72) Inventors: Shimpei Yoshioka, Tokyo (JP); Yoshihiko Ono, Tokyo (JP); Katsutoshi Takashima, Tokyo (JP); Takayuki Futatsuka, Tokyo (JP); Kentaro Sato, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 176 days.

(21) Appl. No.: 17/432,349

(22) PCT Filed: Nov. 21, 2019

(86) PCT No.: PCT/JP2019/045678
§ 371 (c)(1),
(2) Date: Aug. 19, 2021

(87) PCT Pub. No.: WO2020/170530
PCT Pub. Date: Aug. 27, 2020

(65) Prior Publication Data
US 2022/0056552 A1 Feb. 24, 2022

(30) Foreign Application Priority Data
Feb. 22, 2019 (JP) .................................. 2019-030344

(51) Int. Cl.
*C21D 8/02* (2006.01)
*C22C 38/02* (2006.01)
(Continued)

(52) U.S. Cl.
CPC .............. *C21D 9/48* (2013.01); *B32B 15/012* (2013.01); *B32B 15/013* (2013.01); *C21D 6/002* (2013.01);
(Continued)

(58) Field of Classification Search
CPC ......... C22C 38/02; C22C 38/04; C22C 38/06; C21D 8/0226; C21D 8/0236; C21D 2211/008
See application file for complete search history.

(56) References Cited

U.S. PATENT DOCUMENTS 8,992,697 B2 * 3/2015 Matsuda ............... C22C 38/001
148/333
2011/0287280 A1 11/2011 Shiraki et al.
(Continued)

FOREIGN PATENT DOCUMENTS

CN 104195443 A 12/2014
CN 104583437 A 4/2015
(Continued)

OTHER PUBLICATIONS

Feb. 25, 2020 International Search Report issued in International Application No. PCT/JP2019/045678.
(Continued)

*Primary Examiner* — Adam Krupicka
(74) *Attorney, Agent, or Firm* — Oliff PLC (57) ABSTRACT

A hot-pressed member having excellent bending collapsibility, a method for manufacturing the same, and a method for manufacturing a steel sheet for the hot-pressed member. The hot-pressed member includes a steel sheet as a base material, the steel sheet having a specified chemical composition. The hot-pressed member has a microstructure in which a martensite microstructure is present in a volume fraction of 70% or greater, and a number density of inclusions having a
(Continued)

longest diameter of 25 μm or greater is 0.02/mm² or less. The hot-pressed member has a tensile strength of 1.8 GPa or greater.

20 Claims, 2 Drawing Sheets

(51) Int. Cl.

| | |
|---|---|
| *C22C 38/04* | (2006.01) |
| *C22C 38/06* | (2006.01) |
| *C23C 2/06* | (2006.01) |
| *C23C 2/02* | (2006.01) |
| *C21D 9/48* | (2006.01) |
| *B32B 15/01* | (2006.01) |
| *C21D 6/00* | (2006.01) |
| *C22C 38/00* | (2006.01) |
| *C22C 38/08* | (2006.01) |
| *C22C 38/10* | (2006.01) |
| *C22C 38/12* | (2006.01) |
| *C22C 38/16* | (2006.01) |
| *C22C 38/26* | (2006.01) |
| *C22C 38/28* | (2006.01) |
| *C22C 38/38* | (2006.01) |
| *C22C 38/60* | (2006.01) |
| *C23C 2/40* | (2006.01) |
| *C23C 2/12* | (2006.01) |

(52) U.S. Cl.
CPC .......... *C21D 6/005* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/16* (2013.01); *C22C 38/26* (2013.01); *C22C 38/28* (2013.01); *C22C 38/38* (2013.01); *C22C 38/60* (2013.01); *C23C 2/40* (2013.01); *C21D 2211/008* (2013.01); *C23C 2/06* (2013.01); *C23C 2/12* (2013.01)

(56) References Cited

U.S. PATENT DOCUMENTS

| | | | |
|---|---|---|---|
| 2016/0138125 | A1 | 5/2016 | Kubo |
| 2018/0100212 | A1 | 4/2018 | Ono et al. |
| 2018/0171429 | A1 | 6/2018 | Suwa et al. |
| 2019/0010587 | A1 | 1/2019 | Murakami et al. |

FOREIGN PATENT DOCUMENTS

| | | |
|---|---|---|
| CN | 107109553 A | 8/2017 |
| EP | 2546375 A1 | 1/2013 |
| EP | 2 886 674 A1 | 6/2015 |
| EP | 3088552 A1 | 11/2016 |
| EP | 3 181 715 A1 | 6/2017 |
| EP | 3 486 346 A1 | 5/2019 |
| JP | 2006-152427 A | 6/2006 |
| JP | 2007-314817 A | 12/2007 |
| JP | 2010-043323 A | 2/2010 |
| JP | 2010-215954 A | 9/2010 |
| JP | 5729213 B2 | 6/2015 |
| JP | 5803836 B2 | 11/2015 |
| JP | 2017-043825 A | 3/2017 |
| JP | 6460287 B1 | 1/2019 |
| KR | 20120121406 A | 11/2012 |
| WO | 2014/207879 A1 | 12/2014 |
| WO | 2016/093316 A1 | 6/2016 |
| WO | 2016/152163 A1 | 9/2016 |
| WO | 2018/062381 A1 | 4/2018 |
| WO | 2018/134872 A1 | 7/2018 |

OTHER PUBLICATIONS

Feb. 19, 2023 Office Action issued in Chinese Patent Application No. 201980092323.9.
Dec. 9, 2021 Extended Search Report issued in European Patent Application No. 19915900.5.
Jarvinen, Henri et al., "Microstructure-Property Relationships of Novel Ultra-High-Strength Press Hardening Steels" CrossMark, vol. 50A, pp. 816-836, Feb. 2019.
Aug. 2, 2022 Office Action issued in Chinese Patent Application No. 201980092323.9.
Apr. 3, 2023 Office Action issued in Korean Patent Application No. 10-2021-7026346.
Jun. 22, 2023 Office Action issued in Chinese Patent Application No. 201980092323.9.

* cited by examiner

HOT-PRESSED MEMBER, METHOD FOR MANUFACTURING THE SAME, AND METHOD FOR MANUFACTURING STEEL SHEET FOR HOT-PRESSED MEMBER

TECHNICAL FIELD

This application relates to a hot-pressed member and a method for manufacturing the same, the hot-pressed member having a tensile strength of 1.8 GPa or greater and excellent bending collapsibility. The application also relates to a method for manufacturing a steel sheet for a hot-pressed member, the steel sheet being the base material for the hot-pressed member.

BACKGROUND

For a reduction in $CO_2$ emission and enhancement of crash safety, there is a growing need for increasing the strength of a steel sheet that is used in automotive frame parts. Accordingly, hot-pressed parts of a 1.5 GPa class have been increasingly employed. In recent years, the employment of hot-pressed parts of a 1.8 GPa class has also been increasing. Steel sheets having a strength of the 1.8 GPa class have low ductility and toughness compared with steel sheets of a 1.2 to 1.5 GPa class, which are used in the conventional art.

Patent Literature 1 proposes a technique for improving the toughness of hot-pressed parts of a 1.2 to 2.2 GPa class. In the technique, a steel material is hot-pressed and subsequently subjected to a heat treatment at 150 to 200° C. When hot-pressed parts of the 1.8 GPa class actually underwent crash deformation, however, cracking due to the low toughness occurred in the parts in some cases. That is, the toughness of hot-pressed parts of a greater than 1.8 GPa class was still not sufficiently improved.

Patent Literature 2 proposes a technique in which a soft ferrite microstructure is formed in a surface layer portion of a steel sheet, to enhance the ductility of a hot-pressed part, thereby enhancing a crash property of the part. However, in cases where an excessive amount of soft ferrite is present in the microstructure of a steel sheet that serves as the base material, a yield strength of the steel sheet may be noticeably reduced, and, consequently, performance of the part may be significantly impaired.

CITATION LIST

Patent Literature

PTL 1: Japanese Patent No. 5729213
PTL 2: Japanese Patent No. 5803836

SUMMARY

Technical Problem

Improving the bending collapsibility of a hot-pressed member having a tensile strength of 1.8 GPa or greater is difficult. Thus, none of the steel sheets that have been developed, including steel sheets of types other than those mentioned, have these characteristics in combination. Note that the "hot-pressed member" refers to an automotive part (hereinafter referred to simply as a "part") manufactured by subjecting a heated steel sheet to forming that uses a die assembly and then subjecting the resultant to quenching.

Accordingly, objects of the disclosed embodiments are to provide a hot-pressed member and a method for manufacturing the same, the hot-pressed member having a tensile strength of 1.8 GPa or greater and excellent bending collapsibility, and to provide a method for manufacturing a steel sheet for a hot-pressed member. In the disclosed embodiments, examples of the steel sheet for a hot-pressed member, which is used as the base material for a hot-pressed member, include not only cold rolled steel sheets but also galvanized cold rolled steel sheets (including galvannealed cold rolled steel sheets), electrogalvanized cold rolled steel sheets (including zinc-nickel alloy-electroplated cold rolled steel sheets), and aluminum coated cold rolled steel sheets or the like.

As used herein, the expression "having excellent bending collapsibility" refers to having a property in which a ratio of a maximum load (kN) to a yield strength (MPa) (maximum load (kN)/yield strength (MPa)) is 0.044 or greater. The values of the yield strength (MPa) and the maximum load (kN) are those measured in accordance with the method described in the Examples section.

Solution to Problem

The present inventors discovered that in instances where inclusions having a longest diameter of 25 μm or greater are present in an abundance ratio greater than a specific abundance ratio, the occurrence of cracking originating at the inclusions during collapse of a part is facilitated. In the past, inclusions have not been regarded as an important issue because inclusions do not present a problem for a hot-pressed member in which a steel sheet having a relatively low strength and therefore having sufficient ductility is used as the base material and also because the abundance ratio of inclusions is low. The present inventors discovered that, by reducing the abundance ratio of the inclusions to be less than or equal to a specified abundance ratio, cracking during the collapse of a part can be significantly inhibited. Furthermore, it was discovered that, to further enhance the bending collapsibility of an automotive member, it is important to increase the yield strength of the base material by inhibiting the formation of retained austenite (hereinafter referred to as "retained γ") and bainite due to a localized distribution of C in a temperature range of 400 to 100° C., and for inhibiting the localized distribution of C, it is important to ensure that a cooling rate over the temperature range of 400 to 100° C. is greater than or equal to a specific cooling rate.

A summary of the disclosed embodiments is as follows.
[1] A hot-pressed member, the hot-pressed member including a steel sheet that serves a base material,
the steel sheet having a chemical composition containing, in mass %,
C: 0.28% or greater and less than 0.50%,
Si: 0.01% or greater and 2.0% or less,
Mn: 0.5% or greater and 3.5% or less,
P: 0.05% or less,
S: 0.01% or less,
Al: 0.01% or greater and 1.00% or less,
N: 0.01% or less, and
O: 0.0013% or less, with the balance being Fe and incidental impurities,
the hot-pressed member having a microstructure in which martensite is present in a volume fraction of 70% or greater, and a number density of inclusions having a longest diameter of 25 μm or greater is less than or equal to 0.02/mm$^2$, the hot-pressed member having a tensile strength of 1.8 GPa or greater.

[2] The hot-pressed member according to [1], wherein the chemical composition of the steel sheet further contains, in mass %, one or more selected from
Mo: 0.005% or greater and 0.35% or less,
Cr: 0.005% or greater and 0.35% or less,
Nb: 0.001% or greater and 0.10% or less,
Ti: 0.001% or greater and 0.15% or less,
B: 0.0002% or greater and 0.0050% or less,
Sb: 0.001% or greater and 0.020% or less,
Ca: 0.005% or less,
V: 0.003% or greater and 0.05% or less,
Cu: 0.005% or greater and 0.50% or less,
Ni: 0.005% or greater and 0.50% or less, and
Sn: 0.002% or greater and 0.50% or less.

[3] The hot-pressed member according to [1] or [2], wherein the chemical composition of the steel sheet further contains, in mass %, one or more selected from Mg, Co, As, W, Pb, Ta, REMs, Cs, Ce, Zr, and Hf in a total amount of 0.01% or less.

[4] The hot-pressed member according to any one of [1] to [3], wherein, in the microstructure, the martensite is present in a volume fraction of 80% or greater.

[5] The hot-pressed member according to any one of [1] to [4], wherein the steel sheet has an aluminum or aluminum alloy coated layer or a zinc or zinc alloy coated layer on a surface.

[6] A method for manufacturing a steel sheet for a hot-pressed member, the method including:
casting a slab having the chemical composition according to any one of [1] to [3], in a manner in which molten steel is maintained in a tundish for an average residence time of 10 minutes or more;
holding the slab at a temperature of 1200° C. or greater for 20 minutes or more and subsequently hot rolling the slab to form a hot rolled sheet;
cold rolling the hot rolled sheet to form a cold rolled sheet; and
annealing the cold rolled sheet at a temperature of an $Ac_1$ transformation temperature or greater.

[7] The method for manufacturing a steel sheet for a hot-pressed member according to [6], further including forming an aluminum or aluminum alloy coated layer or a zinc or zinc alloy coated layer on a surface of a steel sheet that results after the annealing.

[8] A method for manufacturing a hot-pressed member, the method including:
heating a steel sheet for a hot-pressed member within a temperature range of an $Ac_3$ transformation temperature to 1000° C. for 30 to 600 seconds, the steel sheet for a hot-pressed member being a steel sheet prepared by the method for manufacturing a steel sheet for a hot-pressed member according to [6] or [7], and subsequently hot-pressing the steel sheet;
cooling the steel sheet in a manner in which an average cooling rate over a temperature range of an $Ar_3$ transformation temperature to 400° C. is greater than 50° C./s;
cooling the steel sheet to room temperature in a manner in which an average cooling rate over a temperature range of 400 to 100° C. is greater than 20° C./s; and
holding the steel sheet within a temperature range of 100 to 300° C. for 300 to 3600 seconds.

[9] The method for manufacturing a hot-pressed member according to [8], wherein the average cooling rate over the temperature range of 400 to 100° C. is greater than 40° C./s.

Advantageous Effects

With the disclosed embodiments, a hot-pressed member and a steel sheet for a hot-pressed member are provided. The hot-pressed member has a tensile strength of 1.8 GPa or greater and excellent bending collapsibility. The steel sheet serves as the base material for the hot-pressed member.

DETAILED DESCRIPTION

1. Chemical Composition of Steel Sheet

First, reasons for limitations on a composition of a steel sheet for a hot-pressed member that is used as the base material for a hot-pressed member in the disclosed embodiments will be described. In the following description, the symbol "%" associated with a component means "mass %".

C: 0.28% or Greater and Less than 0.50%

C is an element effective for increasing the strength of a steel sheet. C is an important element for ensuring that strengthened martensite exists after hot pressing, thereby enhancing the strength of the steel. If a C content is less than 0.28%, the martensite that exists after hot pressing has insufficient hardness, and, consequently, the tensile strength of 1.8 GPa or greater cannot be achieved. Accordingly, the C content is to be greater than or equal to 0.28%. Preferably, the C content is greater than or equal to 0.30%. On the other hand, if the C content is greater than or equal to 0.50%, retained γ is increased; as a result, the strength of the base material no longer increases, and in addition, spot weldability is degraded. Accordingly, the C content is to be less than 0.50%. The C content is preferably less than 0.45% and more preferably less than 0.40%.

Si: 0.01% or Greater and 2.0% or Less

Si is an element effective for increasing strength because Si strengthens ferrite through solid solution strengthening. To produce this effect, a Si content is specified to be greater than or equal to 0.01%. However, if an excessive amount of Si is present, chemical convertibility is degraded. Accordingly, the Si content is specified to be less than or equal to 2.0%. Preferably, the Si content is less than or equal to 1.3%.

Mn: 0.5% or Greater and 3.5% or Less

Mn increases hardenability associated with hot pressing. Accordingly, Mn is an element that contributes to ensuring that martensite exists after hot pressing and, therefore, increasing strength. Producing this effect requires the presence of Mn in an amount greater than or equal to 0.5%. Preferably, a Mn content is greater than or equal to 1.0%. On the other hand, if an excessive amount of Mn is present, coarse MnS forms, which degrades bending collapsibility, because coarse MnS acts as a microcrack initiation site during bending collapse. Accordingly, the Mn content is specified to be less than or equal to 3.5%. Preferably, the Mn content is less than or equal to 2.5%.

P: 0.05% or Less

P contributes to increasing strength through solid solution strengthening. However, if an excessive amount of P is present, noticeable segregation of P occurs at grain boundaries, which embrittles the grain boundaries, and, consequently, the bending collapsibility is reduced. Accordingly, a P content is specified to be less than or equal to 0.05%. Preferably, the P content is less than or equal to 0.04%. There is no particular lower limit of the P content; currently, an industrially feasible lower limit is approximately 0.002%, and, therefore, the P content is substantially greater than or equal to the industrially feasible lower limit.

S: 0.01% or Less

If a S content is high, a large number of sulfides such as MnS form, which leads to the occurrence of cracking because such inclusions act as initiation sites, and, consequently, the bending collapsibility is reduced. Accordingly, the S content is specified to be less than or equal to 0.01%. Preferably, the S content is less than or equal to 0.0045%. There is no particular lower limit of the S content; an industrially feasible lower limit is approximately 0.0002%, and, therefore, the S content is substantially greater than or equal to the industrially feasible lower limit.

Al: 0.01% or Greater and 1.00% or Less

Al is an element necessary for deoxidation, and producing this effect requires the presence of Al in an amount greater than or equal to 0.01%. When Al is present in an amount greater than 1.00%, the effect no longer increases. Accordingly, an Al content is specified to be less than or equal to 1.00%. The Al content is preferably less than or equal to 0.50%, more preferably less than or equal to 0.10%, and even more preferably less than or equal to 0.05%.

N: 0.01% or Less

N forms a coarse nitride, which degrades the bending collapsibility, and, therefore, a content thereof needs to be limited. If the N content is greater than 0.01%, the tendency becomes noticeable. Accordingly, the N content is specified to be less than or equal to 0.01%. The N content is preferably less than or equal to 0.008% and more preferably less than or equal to 0.0055%. There is no particular lower limit of the N content; however, if the N content is excessively reduced, cost effectiveness associated with steelmaking is reduced, and, therefore, it is preferable that the N content be greater than or equal to 0.0003%.

O: 0.0013% or Less

If an O content is high, O forms inclusions with an element, such as Al, Mg, or Ca. In some cases, depending on the content and/or a manufacturing method, O forms extremely large inclusions having a longest diameter of 25 µm or greater, which significantly degrades the bending collapsibility of the hot-pressed member. An effective way to reduce a size and a number density of inclusions is to reduce an amount of O itself, and, accordingly, the O content is specified to be less than or equal to 0.0013%. The O content is preferably less than or equal to 0.0012% and more preferably less than or equal to 0.0008%.

The components described above are the basic components of the steel sheet used in the disclosed embodiments. The steel sheet used in the disclosed embodiments has a chemical composition that contains the basic components described above and in which the balance, other than the components described above, includes Fe (iron) and incidental impurities. It is preferable that the steel sheet of the disclosed embodiments have a chemical composition that contains the components described above and in which the balance consists of Fe and incidental impurities. In the disclosed embodiments, in addition to the basic components described above, one or more selected from the following components may be selectively included within the ranges described below.

Mo: 0.005% or Greater and 0.35% or Less

Mo increases hardenability associated with hot pressing. Accordingly, Mo is an element that contributes to ensuring that martensite exists after hot pressing and, therefore, increasing strength. In terms of producing the effect, it is preferable that Mo be present in an amount greater than or equal to 0.005%. More preferably, a Mo content is greater than or equal to 0.010%. On the other hand, even if a large amount of Mo is added, the effect no longer increases, whereas cost increases, and chemical convertibility is degraded. Accordingly, it is preferable that the Mo content be less than or equal to 0.35%.

Cr: 0.005% or Greater and 0.35% or Less

Similar to Mo, Cr increases hardenability associated with hot pressing. Accordingly, Cr is an element that contributes to ensuring that martensite exists after hot pressing and, therefore, increasing strength. In terms of producing the effect, it is preferable that Cr be present in an amount greater than or equal to 0.005%. More preferably, a Cr content is greater than or equal to 0.010%. On the other hand, even if a large amount of Cr is added, the effect no longer increases, and a surface oxide forms, which degrades coatability. Accordingly, it is preferable that the Cr content be less than or equal to 0.35%.

Nb: 0.001% or Greater and 0.10% or Less

Nb is an element that can contribute to increasing strength by forming a fine-grained carbonitride. In addition, since Nb reduces the austenite grain diameter associated with hot pressing, Nb is an element that contributes to enhancing the bending collapsibility. In terms of producing these effects, it is preferable that a Nb content be greater than or equal to 0.001%. More preferably, the Nb content is greater than or equal to 0.005%. On the other hand, even if a large amount of Nb is added, the effect no longer increases, and inclusions such as NbC form, which degrades the bending collapsibility. Accordingly, it is preferable that the upper limit of the Nb content be less than or equal to 0.10%. The Nb content is more preferably less than or equal to 0.08% and even more preferably less than or equal to 0.05%.

Ti: 0.001% or Greater and 0.15% or Less

Ti is an element that can contribute to increasing strength by forming a fine-grained carbonitride. Since Ti reduces the austenite grain diameter associated with hot pressing, Ti is an element that contributes to enhancing the bending collapsibility. In terms of producing these effects, it is preferable that a Ti content be greater than or equal to 0.001%. On the other hand, if a large amount of Ti is added, inclusions such as TiC form, which degrades the bending collapsibility. Accordingly, it is preferable that the Ti content be less than or equal to 0.15%. More preferably, the Ti content is less than or equal to 0.08%.

B: 0.0002% or Greater and 0.0050% or Less

B increases hardenability associated with hot pressing. Accordingly, B is an element that contributes to ensuring that martensite exists after hot pressing and, therefore, increasing strength. Furthermore, B segregates at grain boundaries and, accordingly, enhances grain boundary strength; therefore, B is effective for enhancing the bending collapsibility. In terms of producing the effect, it is preferable that a B content be greater than or equal to 0.0002%. However, if an excessive amount of B is added, B forms coarse precipitates with C and, therefore, reduces the bending collapsibility. Accordingly, the B content is preferably less than or equal to 0.0050% and more preferably less than or equal to 0.0035%.

Sb: 0.001% or Greater and 0.020% or Less

Sb inhibits oxidation or nitridation of a surface layer and, therefore, inhibits an associated reduction in C and/or B. Accordingly, Sb contributes to increasing strength. In terms of producing the effect, it is preferable that a Sb content be greater than or equal to 0.001%. More preferably, the Sb content is greater than or equal to 0.004%. On the other hand, if Sb is added in an amount greater than 0.020%, a load applied in rolling increases, which reduces productivity. Accordingly, it is preferable that the Sb content be less than or equal to 0.020%. More preferably, the Sb content is less than or equal to 0.015%.

Ca: 0.005% or Less

Ca controls shapes of sulfides and oxides, thereby inhibiting the formation of coarse MnS. Accordingly, Ca has an effect of enhancing the bending collapsibility. No particular lower limit is specified for a Ca content; an industrially feasible lower limit is approximately 0.0001%, and, therefore, in instances where Ca is to be present, the content is substantially greater than or equal to the industrially feasible lower limit. If an excessive amount of Ca is added, workability is degraded. Accordingly, it is preferable that the Ca content be less than or equal to 0.005%.

V: 0.003% or Greater and 0.05% or Less

V can contribute to increasing strength by forming a fine-grained carbonitride. In terms of producing the effect, it is preferable that a V content be greater than or equal to 0.003%. On the other hand, if a large amount of V is added, the bending collapsibility is degraded. Accordingly, it is preferable that the V content be less than or equal to 0.05%.

Cu: 0.005% or Greater and 0.50% or Less

Cu enhances corrosion resistance, thereby enhancing delayed fracture resistance. Accordingly, Cu may be added as necessary. Furthermore, Cu is an element that is unintentionally incorporated when scrap metal is utilized as a raw material. Permitting the unintentional incorporation of Cu enables the utilization of a recycled material source as a raw material source, which results in a reduction in the cost of manufacturing. From these standpoints, it is preferable that Cu be present in an amount greater than or equal to 0.005%. On the other hand, even if Cu is present in an amount greater than 0.50%, the effects no longer increase, and a surface defect attributable to Cu tends to occur. Accordingly, it is preferable that a Cu content be less than or equal to 0.50%.

Ni: 0.005% or Greater and 0.50% or Less

Similar to Cu, Ni enhances corrosion resistance, thereby enhancing delayed fracture resistance. Accordingly, Ni may be added as necessary. Furthermore, in cases where Ni is added in an instance in which Cu is added, an effect of inhibiting a Cu-caused surface defect is produced. Accordingly, Ni is effective in instances in which Cu is added. In terms of producing these effects, it is preferable that Ni be present in an amount greater than or equal to 0.005%. However, addition of a large amount of Ni significantly increases the cost. Accordingly, it is preferable that a Ni content be less than or equal to 0.50%.

Sn: 0.002% or Greater and 0.50% or Less

Similar to Cu, Sn enhances corrosion resistance, thereby enhancing delayed fracture resistance. Accordingly, Sn may be added as necessary. In terms of producing the effect, it is preferable that Sn be present in an amount greater than or equal to 0.002%. However, if a large amount of Sn is added, castability is degraded, and Sn segregates at prior γ grain boundaries, which degrades the bending collapsibility. Accordingly, it is preferable that a Sn content be less than or equal to 0.50%.

One or More Selected from Mg, Co, As, W, Pb, Ta, REMs, Cs, Ce, Zr, and Hf: 0.01% or less in total One or more elements different from the elements mentioned above may be added in a total amount of 0.01% or less, to enhance corrosion resistance and/or hardenability. Examples of such elements include Mg, Co, As, W, Pb, Ta, REMs, Cs, Ce, Zr, and Hf.

2. Microstructure of Hot-Pressed Member

Now, limitations on a microstructure of the hot-pressed member will be described in detail.

Martensite is Present in Volume Fraction of 70% or Greater

Martensite is to be present in a volume fraction of 70% or greater so as to enable realization of the tensile strength of 1.8 GPa or greater. The volume fraction is preferably greater than or equal to 80% and more preferably greater than or equal to 85%, so as to further increase the strength. Note that, in the disclosed embodiments, the martensite includes tempered martensite. The remaining microstructures include bainite, ferrite, and/or retained γ. The remaining microstructures are to be present in a volume fraction of less than 30% in total. The volume fraction of the remaining microstructures in total is preferably less than 20% and more preferably less than or equal to 15%.

Number Density of Inclusions Having Longest Diameter of 25 μm or Greater is Less than or Equal to 0.02/mm$^2$ In the disclosed embodiments, the "longest diameter of an inclusion" refers to the value of the longest diameter of an inclusion as observed in a fracture surface. Inclusions having the longest diameter of 25 μm or greater significantly reduce the bending collapsibility of a part, and, therefore, it is desirable that such inclusions be reduced. If a number density of the inclusions is greater than 0.02/mm$^2$, cracking occurs during bending collapse, with the inclusions acting as initiation sites, and, therefore, the strength of the part is reduced. Accordingly, the number density of the inclusions is to be less than or equal to 0.02/mm$^2$. No apparent correlation was found between the number density of inclusions having the longest diameter of less than 25 μm and the strength of the part, and, therefore, the inclusions of interest in the disclosed embodiments are those having the longest diameter of 25 μm or greater. Note that, regarding the inclusions, most nitride inclusions have the longest diameter of less than 25 μm, and, therefore, the number density of nitride inclusions substantially does not affect the properties obtained in the present application.

Inclusions have a low probability of presence, and, therefore, in a case where a cross-sectional microscopic examination is employed, the evaluation area may be insufficient. Accordingly, the present inventors determined the number density of the inclusions by observing a fracture surface, which was formed by embrittling the base material with liquid nitrogen and then applying forced displacement thereto. In the disclosed embodiments, a tensile test specimen was cut from a part (hot-pressed member), and a fracture surface thereof was evaluated. However, there may be instances in which a flat portion has a small area, and thus, a tensile test specimen cannot be cut; even in such instances, fracturing of a part can be achieved by bending or compression.

3. Coated Layer of Steel Sheet

Now, a coated layer of the steel sheet for a hot-pressed member of the disclosed embodiments will be described in detail.

The steel sheet for a hot-pressed member of the disclosed embodiments may be a steel sheet having no coated layer applied thereto or may have a coated layer, which may be applied to a surface of the steel sheet prior to hot pressing to prevent oxidation that may be caused by the hot pressing or to enhance corrosion resistance.

In the disclosed embodiments, the coated layer that may be applied to the surface of the steel sheet for a hot-pressed member is suitably an aluminum or aluminum alloy coated layer or a zinc or zinc alloy coated layer. In cases where such a coated layer is applied to the surface of the steel sheet for a hot-pressed member, oxidation of the surface of the steel sheet that may be caused by the hot pressing is prevented, and in addition, the corrosion resistance of the hot-pressed member is enhanced.

Examples of the aluminum or aluminum alloy coated layer include an aluminum-silicon coated layer formed, for example, by a hot-dipping method. Furthermore, examples of the zinc or zinc alloy coated layer include galvanized coated layers formed, for example, by a hot-dip galvanizing method and galvannealed coated layers obtained by alloying a galvanized coated layer, and the examples also include electroplated zinc coated layers and electroplated zinc-nickel alloy coated layers formed by an electroplating method.

It should be noted that the aluminum or aluminum alloy coated layer or the zinc or zinc alloy coated layer is not limited to the coated layers mentioned above and may be a coated layer containing, in addition to Al or Zn, which is a principal component, one or more of the following elements: Si, Mg, Ni, Fe, Co, Mn, Sn, Pb, Be, B, P, S, Ti, V, W, Mo, Sb, Cd, Nb, Cr, Sr, and the like. In addition, a method for forming the aluminum or aluminum alloy coated layer or the zinc or zinc alloy coated layer is not limited in any way and may employ any known method such as a hot-dip coating method, an electroplating method, or a vapor deposition coating method. Furthermore, the aluminum or aluminum alloy coated layer or the zinc or zinc alloy coated layer may be a coated layer that has undergone an alloying process performed after the coating step.

The coated layer may be present in a coating weight not particularly limited and may be present in a typical coating weight.

4. Method for Manufacturing Steel Sheet for Hot-Pressed Member

Now, a method for manufacturing the steel sheet for a hot-pressed member, which serves as the base material for the hot-pressed member of the disclosed embodiments, will be described.

In the disclosed embodiments, the steel sheet for a hot-pressed member that serves as the base material for the hot-pressed member is prepared as follows: a slab having the chemical composition described above is cast in a manner in which molten steel is maintained in a tundish for an average residence time of 10 minutes or more; the slab is held at a temperature of 1200° C. or greater for 20 minutes or more and subsequently hot rolled to form a hot rolled sheet; the hot rolled sheet is cold rolled to form a cold rolled sheet; and the cold rolled sheet is annealed at a temperature of an $Ac_1$ transformation temperature or greater to form the steel sheet. Note that the temperatures described below used for heating or cooling a slab, a steel sheet, and the like are temperatures of a surface of the slab, the steel sheet, and the like unless otherwise stated.

Continuous Casting

Molten steel is to be maintained in a tundish for an average residence time of 10 minutes or more. This promotes floating of inclusions to the surface. To produce the effect sufficiently, it is necessary to maintain the molten steel therein for 10 minutes or more. The upper limit of the average residence time for the molten steel in the tundish is not particularly limited. It is preferable that the average residence time be less than 25 minutes, because even if the molten steel is maintained therein for 25 minutes or more, the effect no longer increases. Note that the "average residence time" is a value determined by [amount (t) of molten steel in tundish/throughput (t/min)] in a steady state period, in which the amount of the molten steel in the tundish has reached a constant value.

Hot Rolling

In the hot rolling, first of all, it is important to ensure a slab temperature of 1200° C. or greater and a holding time of 20 minutes or more. As a result, dissolution of sulfides, such as MnS, is promoted, and, therefore, reduction in the size and the number of inclusions is achieved. Examples of methods for hot rolling the slab include a method in which the slab is heated and subsequently rolled; a method in which a continuously cast slab is subjected to direct rolling without being heated; and a method in which a continuously cast slab is heated for a short time and then rolled. The upper limit of the slab temperature is not particularly limited and may be less than or equal to 1300° C. This is preferable because excessively increasing the heating temperature is not preferable in terms of cost. Furthermore, the upper limit of the holding time is not particularly limited and may be less than or equal to 120 minutes. This is preferable from the standpoint of enhancing productivity. The conditions of a finishing delivery temperature and a coiling temperature are not particularly limited. Preferably, the finishing delivery temperature may be within a temperature range of 830 to 950° C., and the coiling temperature may be within a temperature range of 450 to 600° C.

In the continuous casting, the average residence time for molten steel in a tundish is to be controlled as described above, and in the hot rolling, the slab temperature and the slab temperature holding time are to be controlled as described above. Consequently, the number density of inclusions having a longest diameter of 25 μm or greater is controlled in the steel sheet for a hot-pressed member. As a result, in the hot-pressed member, the number density of less than or equal to $0.02/mm^2$ of the inclusions having the longest diameter of 25 μm or greater is achieved.

Cold Rolling

The cold rolling may be carried out by using a common method, and conditions therefor are not particularly limited. The cold rolling may be performed at a rolling reduction ratio (cold rolling ratio) of 40% or greater. This is preferable from the standpoint of stabilizing recrystallization behavior, the development of texture, and the orientation of recrystallized grains during the subsequent continuous annealing.

Annealing

It is desirable that the base material before being subjected to hot forming be soft so as to be formed to have a blank size suitable for a member. Accordingly, after the cold rolling, the steel sheet is to be annealed at a temperature of an $Ac_1$ transformation temperature or greater. While an annealing temperature and an annealing time may be varied as necessary, it is preferable that the annealing temperature be less than or equal to 1000° C., and the annealing time be less than or equal to 10 minutes, because annealing at a high temperature for a long time increases the cost of manufacturing.

The $Ac_1$ transformation temperature can be determined by using the following equation.

$$Ac_1 \text{ transformation temperature (° C.)} = 723 - 10.7\text{Mn} - 16.9\text{Ni} + 29.1\text{Si} + 16.9\text{Cr} + 290\text{As} + 6.38\text{W}$$

Note that the chemical symbols in the equation each represent a content (mass %) of the element. The content of an element that is not included is 0 (zero), and the calculation is to be performed accordingly.

The steel sheet manufactured by the manufacturing process described above may be used as it is as the steel sheet for a hot-pressed member of the disclosed embodiments. Alternatively, depending on the purpose, a coating step for applying an aluminum or aluminum alloy coated layer, a zinc or zinc alloy coated layer, or the like to the surface of the steel sheet that results after the annealing may be performed.

The coating step is not limited in any way and may employ any known method, such as a hot-dip coating method, an electroplating method, or a vapor deposition coating method. Furthermore, an alloying process may be performed after the coating step.

5. Method for Manufacturing Hot-Pressed Member

Now, a method for manufacturing the hot-pressed member will be described.

A method for manufacturing the hot-pressed member of the disclosed embodiments is as follows. The steel sheet for a hot-pressed member prepared by the method for manufacturing the steel sheet for a hot-pressed member is heated within a temperature range of an $Ac_3$ transformation temperature to 1000° C. for 30 to 600 seconds and subsequently subjected to hot pressing. The steel sheet is then cooled in a manner in which an average cooling rate over a temperature range of an $Ar_3$ transformation temperature to 400° C. is greater than 50° C./s, the steel sheet is then cooled to room temperature in a manner in which an average cooling rate over a temperature range of 400 to 100° C. is greater than 20° C./s, and the steel sheet is then held within a temperature range of 100 to 300° C. for 300 to 3600 seconds.

For the heating within the temperature range of the $Ac_3$ transformation temperature to 1000° C., a heating furnace to be used may be an electric furnace, a gas furnace, an electric resistance heating furnace, a far infrared radiation heating furnace, or the like. If the heating temperature is less than the $Ac_3$ transformation temperature, a volume fraction of austenite is reduced, and as a result, the volume fraction of martensite after hot pressing is less than 70%; consequently, the tensile strength of 1.8 GPa or greater cannot be ensured. Furthermore, if the heating temperature is greater than 1000° C., the cost of manufacturing increases. The heating time is to be greater than or equal to 30 seconds so as to stably ensure the volume fraction of austenite. On the other hand, if the heating time is too long, the cost of manufacturing increases, and, accordingly, the heating time is to be less than or equal to 600 seconds.

The $Ac_3$ transformation temperature can be determined by using the following equation.

$$Ac_3 \text{ transformation temperature (° C.)} = 910 - 203\text{C}^{0.5} - 15.2\text{Ni} + 44.7\text{Si} + 104\text{V} + 31.5\text{Mo} + 13.1\text{W} - 30\text{Mn} - 11\text{Cr} - 20\text{Cu} + 700\text{P} + 400\text{Al} + 120\text{As} + 400\text{Ti}$$

Note that the chemical symbols in the equation each represent a content (mass %) of the element. The content of an element that is not included is 0 (zero), and the calculation is to be performed accordingly.

After the heating, the steel sheet is transferred to a pressing machine to be subjected to hot pressing. If the average cooling rate over the temperature range of the Ara transformation temperature to 400° C. is less than or equal to 50° C./s, ferrite and bainite form, and as a result, it is difficult to ensure 70% or greater martensite; consequently, the tensile strength of 1.8 GPa or greater cannot be ensured. Accordingly, the average cooling rate over the temperature range of the $Ar_3$ transformation temperature to 400° C. is specified to be greater than 50° C./s. The upper limit of the average cooling rate is not particularly limited and may be less than or equal to 200° C./s, which is preferable from the standpoint of reducing the cost of plant investment.

The $Ar_3$ transformation temperature can be determined by using the following equation.

$$Ar_3 \text{ transformation temperature (° C.)} = 910 - 310\text{C} - 80\text{Mn} - 20\text{Cu} - 15\text{Cr} - 55\text{Ni} - 80\text{Mo}$$

Note that the chemical symbols in the equation each represent a content (mass %) of the element. The content of an element that is not included is 0 (zero), and the calculation is to be performed accordingly.

In the temperature range of 400 to 100° C., martensite forms. If the cooling rate over the temperature range is less than or equal to 20° C./s, bainite forms, and self-tempering of martensite occurs; consequently, the tensile strength is reduced. Accordingly, the average cooling rate over the temperature range of 400 to 100° C. is specified to be greater than 20° C./s. Note that in terms of stably obtaining 80% or greater martensite, it is preferable that the average cooling rate be greater than 40° C./s. The upper limit of the average cooling rate is not particularly limited and may be less than or equal to 200° C./s, which is preferable from the standpoint of reducing the cost of plant investment.

If the steel sheet is left in an as-hot-pressed state, the toughness of the member is degraded because the martensite is untempered, and, consequently, the member cannot exhibit excellent bending collapsibility. Thus, the steel sheet is to be held within a temperature range of 100 to 300° C. for 300 to 3600 seconds (reheating process), so as to restore toughness to ensure excellent bending collapsibility. If the tempering temperature and the holding time are below these ranges, excellent bending collapsibility cannot be ensured. If the tempering temperature and the holding time are above these ranges, the strength is significantly reduced. Reasons that excellent bending collapsibility can be achieved with the reheating process described above are not clear, but the following assumption can be made: in the martensite, for instance, precipitation of carbides and/or segregation of carbon at an interface occurs, which reduces an amount of dissolved carbon, thereby causing softening, and as a result, mobility of the dislocations, which play a role in deformation, increases.

EXAMPLES

Now, examples of the disclosed embodiments will be described.

Note that the disclosed embodiments are not intended to be limited by the specific examples described below, and it will be understood that the disclosed embodiments may be practiced with appropriate modifications within the scope that conforms to the disclosure; all such modifications are encompassed by the technical scope of the disclosed embodiments.

Steels having the chemical composition shown in Table 1 were obtained by steelmaking, and then, steel sheets for a hot-pressed member were manufactured under the manufacturing conditions shown in Table 2.

TABLE 1

| Steel type | Chemical composition (mass%) | | | | | | | | | Ac₁ transformation temperature (° C.) | Ac₃ transformation temperature (° C.) | Ar₃ transformation temperature (° C.) | Notes |
|---|---|---|---|---|---|---|---|---|---|---|---|---|---|
| | C | Si | Mn | P | S | sol Al | N | O | others | | | | |
| A | 0.32 | 0.39 | 1.54 | 0.019 | 0.0015 | 0.043 | 0.0048 | 0.0012 | — | 718 | 797 | 688 | Example |
| B | 0.48 | 0.36 | 1.28 | 0.024 | 0.0009 | 0.041 | 0.0046 | 0.0008 | — | 720 | 780 | 659 | Example |
| C | 0.31 | 0.02 | 2.54 | 0.011 | 0.0006 | 0.029 | 0.0052 | 0.0012 | — | 696 | 741 | 611 | Example |
| D | 0.47 | 1.90 | 1.45 | 0.017 | 0.0012 | 0.032 | 0.0047 | 0.0009 | — | 763 | 837 | 648 | Example |
| E | 0.29 | 0.69 | 0.50 | 0.010 | 0.0013 | 0.037 | 0.0046 | 0.0012 | — | 738 | 838 | 780 | Example |
| F | 0.31 | 0.40 | 3.30 | 0.020 | 0.001 | 0.031 | 0.0046 | 0.0012 | — | 699 | 742 | 550 | Example |
| G | 0.34 | 0.32 | 1.52 | 0.013 | 0.0014 | 0.044 | 0.0047 | 0.0011 | — | 716 | 787 | 683 | Example |
| H | 0.33 | 0.43 | 1.84 | 0.021 | 0.0017 | 0.035 | 0.0034 | 0.0011 | — | 716 | 786 | 661 | Example |
| I | 0.37 | 0.56 | 0.59 | 0.013 | 0.0016 | 0.038 | 0.0048 | 0.0011 | — | 733 | 818 | 748 | Example |
| J | 0.30 | 0.09 | 2.37 | 0.015 | 0.0011 | 0.036 | 0.0039 | 0.0012 | — | 700 | 757 | 627 | Example |
| K | 0.40 | 0.70 | 2.07 | 0.013 | 0.0020 | 0.036 | 0.0040 | 0.0010 | — | 721 | 774 | 620 | Example |
| L | 0.36 | 0.57 | 1.60 | 0.023 | 0.0017 | 0.036 | 0.0045 | 0.0011 | — | 722 | 796 | 670 | Example |
| M | 0.40 | 0.22 | 1.88 | 0.017 | 0.0014 | 0.031 | 0.0041 | 0.0010 | — | 709 | 759 | 836 | Example |
| N | 0.36 | 0.36 | 1.60 | 0.018 | 0.0015 | 0.037 | 0.0054 | 0.0011 | B: 0.0023, Mo: 0.01, Cu: 0.07 | 716 | 783 | 668 | Example |
| O | 0.44 | 0.44 | 1.59 | 0.013 | 0.001 | 0.038 | 0.0049 | 0.0009 | Cr: 0.02, Nb: 0.015, Ti: 0.033 | 719 | 785 | 646 | Example |
| P | 0.39 | 0.18 | 2.30 | 0.017 | 0.0019 | 0.037 | 0.0042 | 0.0010 | Cu: 0.10, Ni: 0.04, Ca: 0.0032, V: 0.008 | 703 | 747 | 601 | Example |
| Q | 0.39 | 0.28 | 1.33 | 0.013 | 0.0009 | 0.035 | 0.0038 | 0.0010 | B:0.0018, Sn:0.009 | 717 | 779 | 683 | Example |
| R | 0.26 | 0.29 | 1.14 | 0.015 | 0.0012 | 0.037 | 0.0039 | 0.0013 | — | 719 | 811 | 738 | Comparative example |
| T | 0.33 | 0.64 | 0.40 | 0.017 | 0.0021 | 0.035 | 0.0041 | 0.0011 | — | 737 | 836 | 776 | Comparative example |
| U | 0.34 | 0.31 | 3.70 | 0.010 | 0.0003 | 0.032 | 0.0043 | 0.0011 | — | 692 | 714 | 509 | Comparative example |
| V | 0.31 | 0.29 | 2.78 | 0.021 | 0.0122 | 0.030 | 0.0049 | 0.0012 | — | 702 | 753 | 592 | Comparative example |
| W | 0.36 | 0.35 | 2.25 | 0.025 | 0.0020 | 0.004 | 0.0049 | 0.0023 | — | 709 | 755 | 618 | Comparative example |
| X | 0.37 | 0.27 | 1.30 | 0.016 | 0.0021 | 0.032 | 0.0121 | 0.0012 | — | 717 | 784 | 691 | Comparative example |
| Y | 0.35 | 0.66 | 2.92 | 0.007 | 0.0017 | 0.037 | 0.0046 | 0.0016 | — | 711 | 752 | 568 | Comparative example |
| Z | 0.36 | 0.32 | 2.14 | 0.008 | 0.001 | 0.411 | 0.0046 | 0.0012 | Mg: 0.0005, As: 0.0002, W: 0.004 | 709 | 908 | 627 | Example |
| AA | 0.36 | 0.34 | 2.10 | 0.013 | 0.0013 | 0.045 | 0.0042 | 0.0012 | Co: 0.0003, Pb: 0.0005 | 710 | 767 | 630 | Example |
| AB | 0.36 | 0.32 | 2.14 | 0.014 | 0.0014 | 0.040 | 0.0048 | 0.0011 | Ta: 0.0004, REM: 0.0003 | 709 | 764 | 627 | Example |
| AC | 0.38 | 0.35 | 2.09 | 0.014 | 0.0010 | 0.034 | 0.0038 | 0.0012 | Cs: 0.0003, Ce: 0.0004 | 711 | 765 | 631 | Example |
| AD | 0.49 | 0.28 | 3.40 | 0.010 | 0.0012 | 0.780 | 0.0046 | 0.0012 | Z: 0.005, Hf: 0.0004 | 695 | 997 | 486 | Example |
| AE | 0.29 | 0.00 | 1.65 | 0.018 | 0.0006 | 0.028 | 0.0054 | 0.0011 | — | 705 | 775 | 688 | Comparative example |
| AF | 0.46 | 0.56 | 1.68 | 0.012 | 0.0012 | 0.035 | 0.0045 | 0.0011 | Sb: 0.006 | 721 | 769 | 633 | Example |
| AG | 0.39 | 0.82 | 1.96 | 0.018 | 0.0014 | 0.038 | 0.0048 | 0.0010 | — | 726 | 789 | 632 | Example |

TABLE 2

| | | Manufacturing of steel sheet for hot-pressed member | | | | | Hot pressing | | | | Reheating | | |
|---|---|---|---|---|---|---|---|---|---|---|---|---|---|
| Sample No. | Steel type | *1 (min) | Slab temperature (° C.) | *2 (min) | Annealing temperature (° C.) | Coating | Heating temperature (° C.) | Heating time (s) | *3 (° C./s) | *4 (° C./s) | Tempering temperature (° C.) | Holding time (s) | Notes |
| 1 | A | 17 | 1254 | 36 | 748 | CR | 857 | 333 | 54 | 45 | 217 | 1626 | Example |
| 2 | B | 24 | 1233 | 34 | 750 | CR | 840 | 307 | 58 | 37 | 211 | 1090 | Example |
| 3 | C | 23 | 1233 | 28 | 726 | GA | 787 | 249 | 63 | 45 | 176 | 318 | Example |
| 1 | D | 23 | 1260 | 30 | 793 | GA | 897 | 234 | 66 | 34 | 197 | 802 | Example |
| 5 | E | 20 | 1232 | 25 | 788 | GA | 898 | 274 | 64 | 33 | 120 | 1005 | Example |
| 6 | F | 17 | 1299 | 36 | 729 | GAS | 802 | 225 | 59 | 44 | 158 | 1480 | Example |
| 7 | G | 20 | 1238 | 32 | 746 | GAS | 847 | 253 | 64 | 28 | 213 | 715 | Example |
| 8 | H | 27 | 1269 | 33 | 746 | EG | 846 | 317 | 56 | 50 | 174 | 1240 | Example |

TABLE 2-continued

| | | | | Manufacturing of steel sheet for hot-pressed member | | | Hot pressing | | | | Reheating | | |
|---|---|---|---|---|---|---|---|---|---|---|---|---|---|
| Sample No. | Steel type | *1 (min) | Slab temperature (° C.) | *2 (min) | Annealing temperature (° C.) | Coating | Heating temperature (° C.) | Heating time (s) | *3 (° C./s) | *4 (° C./s) | Tempering temperature (° C.) | Holding time (s) | Notes |
| 9 | I | 24 | 1299 | 32 | 763 | EG | 878 | 357 | 54 | 30 | 196 | 841 | Example |
| 10 | J | 22 | 1251 | 36 | 730 | EG | 817 | 268 | 67 | 49 | 201 | 1071 | Example |
| 11 | K | 22 | 1224 | 28 | 751 | EGN | 834 | 295 | 62 | 41 | 198 | 848 | Example |
| 12 | L | 15 | 1263 | 32 | 752 | EGN | 856 | 166 | 72 | 43 | 176 | 1056 | Example |
| 13 | M | 16 | 1256 | 26 | 739 | EGN | 819 | 220 | 67 | 46 | 163 | 928 | Example |
| 14 | N | 25 | 1280 | 29 | 746 | CR | 843 | 331 | 58 | 42 | 178 | 1413 | Example |
| 15 | O | 18 | 1243 | 29 | 749 | CR | 845 | 318 | 61 | 46 | 209 | 1167 | Example |
| 16 | P | 18 | 1296 | 28 | 733 | CR | 807 | 276 | 65 | 36 | 149 | 1002 | Example |
| 17 | Q | 18 | 1261 | 24 | 747 | CR | 839 | 211 | 59 | 44 | 227 | 753 | Example |
| 18 | R | 22 | 1235 | 24 | 749 | EGN | 871 | 232 | 52 | 41 | 194 | 849 | Comparative example |
| 20 | T | 15 | 1214 | 31 | 767 | EGN | 890 | 291 | 62 | 43 | 129 | 1045 | Comparative example |
| 21 | U | 16 | 1251 | 35 | 722 | EGN | 774 | 278 | 67 | 32 | 206 | 830 | Comparative example |
| 22 | V | 28 | 1227 | 28 | 732 | GA | 813 | 370 | 59 | 32 | 190 | 484 | Comparative example |
| 23 | W | 19 | 1267 | 27 | 739 | GA | 815 | 308 | 67 | 31 | 215 | 1310 | Comparative example |
| 24 | X | 21 | 1264 | 29 | 747 | GA | 844 | 225 | 58 | 45 | 257 | 1049 | Comparative example |
| 25 | Y | 19 | 1258 | 25 | 741 | EG | 812 | 320 | 61 | 34 | 190 | 808 | Comparative example |
| 26 | A | 5 | 1273 | 35 | 765 | CR | 857 | 278 | 52 | 48 | 123 | 810 | Comparative example |
| 27 | A | 17 | 1170 | 34 | 760 | CR | 857 | 248 | 59 | 38 | 212 | 895 | Comparative example |
| 28 | A | 17 | 1220 | 16 | 763 | CR | 857 | 297 | 65 | 42 | 185 | 572 | Comparative example |
| 29 | A | 17 | 1231 | 28 | 783 | CR | 680 | 193 | 58 | 32 | 235 | 1314 | Comparative example |
| 31 | B | 24 | 1263 | 24 | 750 | CR | 841 | 270 | 20 | 36 | 236 | 551 | Comparative example |
| 33 | C | 23 | 1229 | 32 | 726 | GA | 800 | 342 | 67 | 43 | 320 | 1087 | Comparative example |
| 34 | C | 23 | 1251 | 29 | 726 | GA | 785 | 290 | 62 | 45 | 260 | 4000 | Comparative example |
| 35 | C | 23 | 1234 | 30 | 726 | CR | 787 | 12 | 71 | 38 | 197 | 956 | Comparative example |
| 36 | C | 23 | 1233 | 31 | 726 | CR | 787 | 355 | 58 | 16 | 201 | 966 | Comparative example |
| 37 | Z | 18 | 1255 | 34 | 739 | CR | 968 | 286 | 69 | 42 | 186 | 1090 | Example |
| 38 | AA | 20 | 1246 | 39 | 740 | CR | 827 | 322 | 66 | 43 | 177 | 589 | Example |
| 39 | AB | 21 | 1248 | 33 | 739 | CR | 824 | 324 | 61 | 44 | 180 | 846 | Example |
| 40 | AC | 26 | 1242 | 34 | 741 | CR | 825 | 346 | 64 | 41 | 173 | 821 | Example |
| 41 | AD | 24 | 1249 | 34 | 725 | CR | 1000 | 589 | 65 | 38 | 183 | 788 | Example |
| 42 | AE | 28 | 1243 | 33 | 735 | EGN | 840 | 589 | 65 | 38 | 183 | 788 | Comparative example |
| 43 | AF | 23 | 1232 | 34 | 751 | CR | 790 | 361 | 52 | 28 | 190 | 1323 | Example |
| 44 | AG | 16 | 1260 | 36 | 756 | CR | 820 | 292 | 50 | 24 | 213 | 1450 | Example |

*1 Average residence time for molten steel in tundish
*2 Slab temperature holding time
*3 Average cooling rate over a range of Ar3 to 400° C.
*4 Average cooling rate over a range of 400 to 100° C.

(1) Manufacturing of Steel Sheet for Hot-Pressed Member

Slabs having the chemical composition shown in Table 1 were manufactured by casting, and subsequently, the slabs were hot rolled in a manner in which a finishing delivery temperature was 830 to 950° C., to form hot rolled sheets, which were subsequently coiled at a coiling temperature of 450 to 600° C. Thereafter, the resulting hot rolled sheets were pickled and subsequently cold rolled. Accordingly, cold rolled sheets (sheet thickness: 1.4 mm) were manufactured. The resulting cold rolled sheets were annealed in a continuous annealing line or a continuous galvanizing line, and, accordingly, cold rolled steel sheets (CR) were obtained. Note that some of the cold rolled steel sheets were subjected to an alloying process after being subjected to a hot-dip galvanizing process, and, accordingly, galvannealed steel sheets (GA) were obtained. Some of the cold rolled steel sheets were subjected to a hot-dip aluminum coating process, and, accordingly, hot-dip aluminum coated steel sheets (GAS) were obtained. Some of the cold rolled steel sheets were subjected to a coating process in an electrogalvanizing line after being annealed in the continuous annealing line, and, accordingly, electrogalvanized steel sheets (EG) and zinc-nickel electroplated steel sheets (EGN) were obtained.

(2) Hot Pressing Process and Reheating Process

Figure 1:
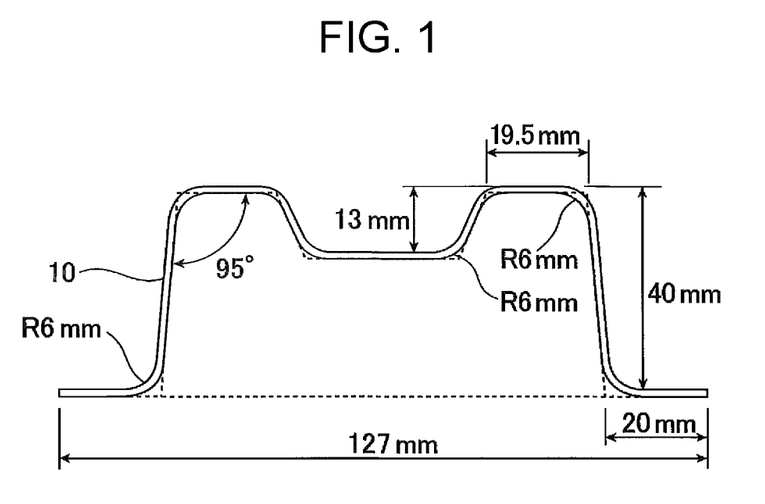
FIG. 1 is an elevational view of a hot-pressed member manufactured in an Example, the hot-pressed member having an M-shaped cross section.

Hot pressing was performed on the manufactured steel sheets (steel sheets for a hot-pressed member) under the conditions shown in Table 2. The heating of each of the steel sheets was carried out in an inert gas atmosphere in an atmospheric heating furnace. A piece measuring 250 mm×400 mm was cut from the heated steel sheet such that the piece had a longitudinal direction that coincided with a direction perpendicular to a rolling direction. The piece was then subjected to hot forming to form a hot-pressed member having an M-shaped cross section such that a bending ridge line was parallel to the longitudinal direction. FIG. 1 is an elevational view of a hot-pressed member 10, which was prepared by the hot forming and had an M-shaped cross section. A die assembly used in the hot pressing had a structure that had a punch width of 120 mm and a forming depth of 40 mm and which included, in a middle portion, a punch having a punch width of 20 mm and a forming depth of 13 mm. The punch had a shoulder radius of 6 mm, and the die had a shoulder radius of 6 mm. Furthermore, the cooling was performed in a combined manner, that is, the steel sheet was contact-cooled while being held between the punch and the die and, in addition, after being released from the state of being held, was naturally cooled on the die. Accordingly, cooling from the temperature at the start of hot pressing to a temperature of 100° C. or less was accomplished. In this instance, the cooling rate was adjusted by varying the time period during which the punch was to be held at the bottom dead center. Subsequently, cooling was performed until room temperature was reached, and thereafter, reheating was carried out.

(3) Evaluation of Tensile Strength

A tensile test specimen of a JIS No. 5 size was cut from a flat portion of a side wall (the one along a 40-mm side) of the member (hot-pressed member) prepared by the above-described process, and a tensile test was conducted in accordance with the specifications of JIS Z 2241 (2011) to evaluate the yield strength and the tensile strength. The tensile test was conducted at a crosshead speed of 10 mm/min. Note that in an instance where a tensile test specimen cannot be cut from the member, the evaluation of the tensile strength can be performed in the following manner: a Vickers hardness test is conducted, and the measured value is converted into a tensile strength (for example, by using SAE J 417).

(4) Evaluation of Microstructure

The quantification of the metallurgical microstructure was performed as follows. A sample of an L cross section (a vertical cross section parallel to the rolling direction) was cut from a flat portion of a side wall of the member that was hot-pressed. The piece was polished, etched in nital, and subjected to an SEM (scanning electron microscope) observation, which was performed in a ¼ thickness position from the surface of the steel sheet, at a magnification of 2000× for 4 fields of view. The photographs of the microstructure that were taken were examined by image analysis to carry out the measurement. Herein, martensite and bainite are microstructures that appeared to be gray through the SEM, and the bainite appeared to be in the form of a lath structure. On the other hand, ferrite is a region that appeared to be black through the SEM. Proportions of the microstructures in the observation fields of view were measured and regarded as volume fractions. The volume fraction of retained $\gamma$ was determined as follows. A thickness of 200 µm layer from a surface of the steel sheet was removed by chemical polishing with oxalic acid, and the sheet surface was subjected to a measurement that used X-ray diffraction intensity analysis. Calculation was performed by using integrated intensities associated with peaks corresponding to the diffraction planes of $(200)\alpha$, $(211)\alpha$, $(220)\alpha$, $(200)\gamma$, $(220)\gamma$, and $(311)\gamma$, which were measured with Mo-K$\alpha$ radiation. Since retained $\gamma$ is difficult to distinguish from martensite in an image used in an SEM observation, the volume fraction of martensite was calculated as follows: the volume fraction of retained $\gamma$ measured by X-ray diffraction intensity analysis was subtracted from a total volume fraction of martensite and retained $\gamma$ measured based on an SEM image.

The number density of inclusions was determined by observing a fracture surface obtained at liquid nitrogen temperature as described above. A JIS No. 5 tensile test specimen was cut as described above and immersed in liquid nitrogen for 1 minute or more, and subsequently, within 10 seconds, forced displacement was applied thereto by using a tensile tester. The crosshead speed was 100 mm/min. In the present Examples, the number density was calculated as follows: the number of inclusions having a longest diameter of 25 µm or greater was measured by observing the fracture surface of 10 test specimens with an SEM, and the number was divided by the area of observation.

(5) Evaluation of Bending Collapsibility

Figure 2:
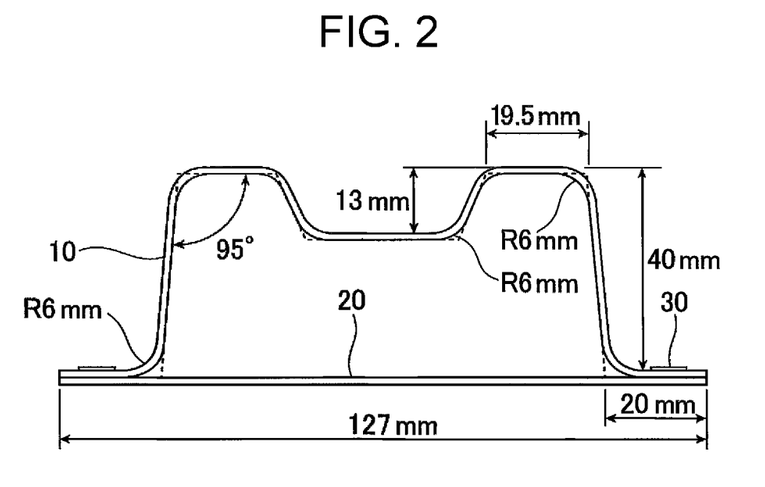
FIG. 2 is an elevational view of a member that resulted after the hot-pressed member illustrated in FIG. 1 was spot-welded to a cold rolled steel sheet.
Figure 3:
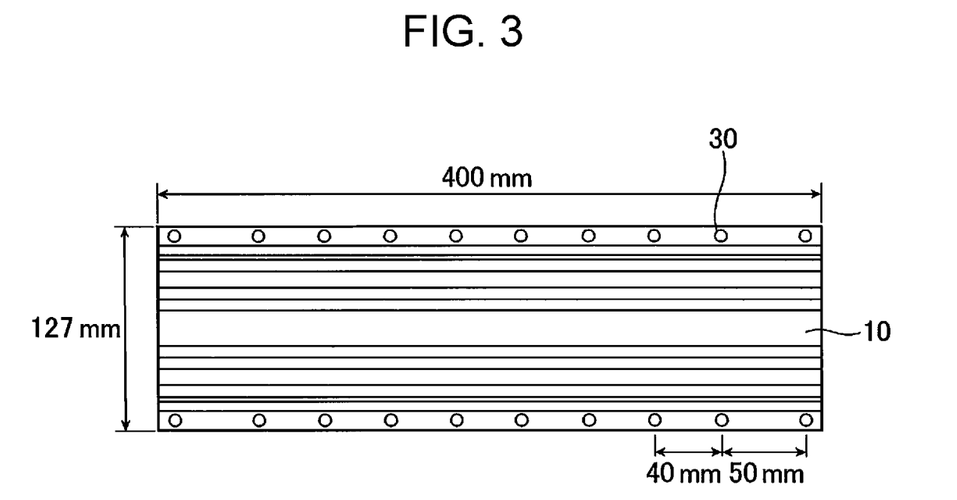
FIG. 3 is a plan view of the member illustrated in FIG. 2.
Figure 4:
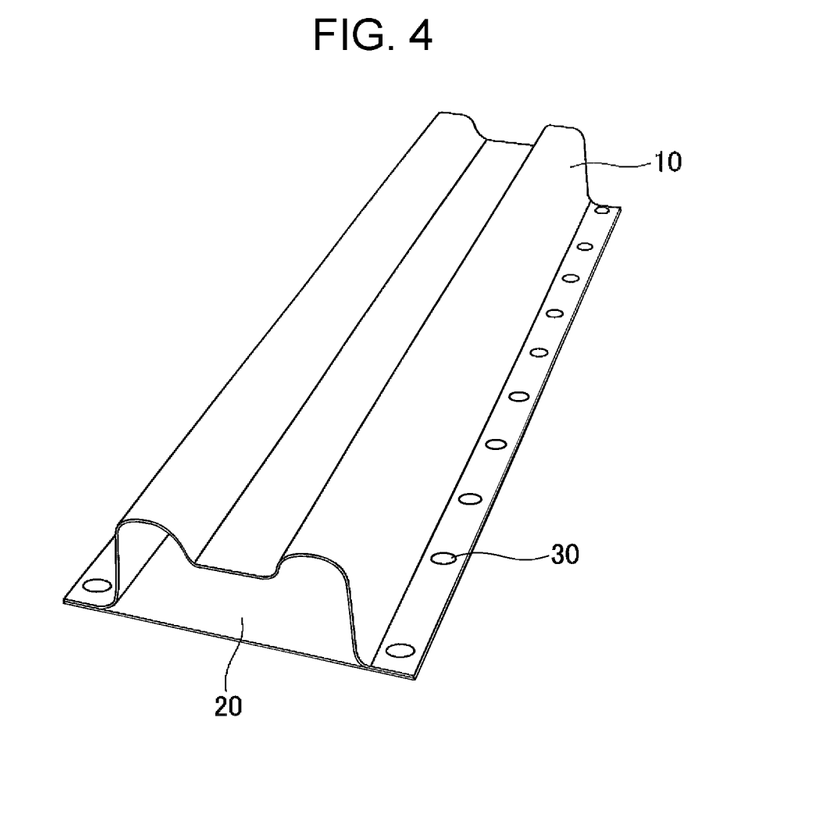
FIG. 4 is a perspective view of the member illustrated in FIG. 2.

To evaluate the bending collapsibility of the member that was hot-pressed, a 3-point bending test was conducted on the member. A hot-pressed member 10, illustrated in FIG. 1, which was prepared by the method described above, was spot-welded to a cold rolled steel sheet of a 590 MPa class with spacings of 40 mm along a longitudinal direction of the hot-pressed member 10; accordingly, a closed cross-section structure was formed. Note that for end portions, the spacing between the spot weld at each of the end portions and its adjacent spot weld was 50 mm. The member prepared by the spot welding is shown in FIGS. 2 to 4. FIG. 2 is an elevational view of the member that resulted after the hot-pressed member 10, illustrated in FIG. 1, was spot-welded to a cold rolled steel sheet 20. The spot welds are indicated by numeral 30. FIG. 3 is a plan view of the member illustrated in FIG. 2. FIG. 4 is a perspective view of the member illustrated in FIG. 2. A 3-point bending crash test was conducted on the member prepared. The distance between supports (supports: rolls with a radius of 25 mm) was 280 mm, and the punch used had a tip radius of 100 mm. The test was conducted at a speed of 0.1 m/s to obtain a load-stroke curve. The ratio of the maximum load (kN) to the yield strength (MPa) was used as the index of the bending collapsibility, because the strength of a part increases with an increase in the strength of the base material.

The microstructure and the tensile properties measured and the results of the measurement of the bending collapsibility are shown in Table 3.

TABLE 3

| Sample No. | Microstructure Volume fraction of martensite (%) | Number density of inclusions having longest diameter of 25 μm or greater (number/mm²) | Tensile properties Yield strength (MPa) | Tensile strength (MPa) | Bending collapsibility (kN/MPa) | Notes |
|---|---|---|---|---|---|---|
| 1 | 96 | 0.02 | 1566 | 1827 | 0.045 | Example |
| 2 | 93 | 0.01 | 1879 | 2272 | 0.047 | Example |
| 3 | 96 | 0.02 | 1563 | 1878 | 0.046 | Example |
| 4 | 92 | 0.01 | 1961 | 2408 | 0.046 | Example |
| 5 | 91 | 0.02 | 1433 | 1810 | 0.047 | Example |
| 8 | 95 | 0.02 | 1590 | 1940 | 0.044 | Example |
| 7 | 89 | 0.02 | 1512 | 1805 | 0.046 | Example |
| 8 | 98 | 0.01 | 1641 | 1970 | 0.049 | Example |
| 9 | 90 | 0.01 | 1584 | 1918 | 0.050 | Example |
| 10 | 98 | 0.02 | 1555 | 1822 | 0.046 | Example |
| 11 | 94 | 0.02 | 1775 | 2138 | 0.045 | Example |
| 12 | 95 | 0.02 | 1675 | 2029 | 0.044 | Example |
| 13 | 96 | 0.02 | 1765 | 2160 | 0.044 | Example |
| 14 | 95 | 0.01 | 1645 | 1991 | 0.048 | Example |
| 15 | 97 | 0.02 | 1880 | 2223 | 0.044 | Example |
| 16 | 93 | 0.02 | 1689 | 2104 | 0.045 | Example |
| 17 | 96 | 0.02 | 1717 | 2017 | 0.045 | Example |
| 18 | 94 | 0.02 | 1402 | 1649 | 0.047 | Comparative example |
| 20 | 68 | 0.02 | 1240 | 1695 | 0.045 | Comparative example |
| 21 | 91 | 0.04 | 1595 | 1913 | 0.029 | Comparative example |
| 22 | 91 | 0.07 | 1510 | 1820 | 0.008 | Comparative example |
| 23 | 90 | 0.06 | 1588 | 1895 | 0.019 | Comparative example |
| 24 | 98 | 0.03 | 1871 | 1913 | 0.035 | Comparative example |
| 25 | 92 | 0.05 | 1841 | 1990 | 0.025 | Comparative example |
| 26 | 97 | 0.03 | 1601 | 1991 | 0.040 | Comparative example |
| 27 | 93 | 0.03 | 1539 | 1814 | 0.040 | Comparative example |
| 28 | 95 | 0.04 | 1568 | 1879 | 0.033 | Comparative example |
| 29 | 46 | 0.02 | 931 | 1288 | 0.047 | Comparative example |
| 31 | 40 | 0.01 | 1223 | 1716 | 0.051 | Comparative example |
| 33 | 95 | 0.02 | 1536 | 1653 | 0.046 | Comparative example |
| 34 | 96 | 0.02 | 1505 | 1688 | 0.047 | Comparative example |
| 35 | 38 | 0.02 | 822 | 1246 | 0.052 | Comparative example |
| 36 | 86 | 0.02 | 1378 | 1662 | 0.047 | Comparative example |
| 37 | 95 | 0.02 | 1660 | 2000 | 0.044 | Example |
| 38 | 95 | 0.02 | 1675 | 2029 | 0.045 | Example |
| 39 | 96 | 0.02 | 1676 | 2025 | 0.045 | Example |
| 40 | 94 | 0.01 | 1659 | 2019 | 0.048 | Example |
| 41 | 93 | 0.02 | 1962 | 2418 | 0.045 | Example |
| 42 | 93 | 0.01 | 1445 | 1728 | 0.050 | Comparative example |
| 43 | 81 | 0.02 | 1532 | 2132 | 0.047 | Example |
| 44 | 71 | 0.02 | 1386 | 1813 | 0.045 | Example |

The hot-pressed members of the Examples had a tensile strength of 1.8 GPa or greater and had a ratio of the maximum load (kN) to the yield strength (MPa) of 0.044 kN/MPa or greater, that is, exhibited excellent bending collapsibility. The hot-pressed members of Comparative Examples, which partially failed to satisfy the requirements of the disclosed embodiments, did not have the predetermined tensile strength or exhibited inferior bending collapsibility.

The invention claimed is:

1. A hot-pressed member comprising a steel sheet as a base material, the steel sheet having a chemical composition comprising, by mass %:
   C: 0.28% or greater and less than 0.50%;
   Si: 0.01% or greater and 2.0% or less;
   Mn: 0.5% or greater and 3.5% or less;
   P: 0.05% or less;
   S: 0.01% or less;
   Al: 0.01% or greater and 1.00% or less;
   N: 0.01% or less;
   O: 0.0013% or less; and
   a balance being Fe and incidental impurities,
   wherein the hot-pressed member has a microstructure in which martensite is present in a volume fraction of 70% or greater, and a number density of inclusions having a longest diameter of 25 μm or greater is 0.02/mm² or less, and
   the hot-pressed member has a tensile strength of 1.8 GPa or greater.

2. The hot-pressed member according to claim 1, wherein the chemical composition further comprises, by mass %, at least one Group selected from the groups consisting of:
   Group A: at least one selected from the group consisting of Mo: 0.005% or greater and 0.35% or less, Cr: 0.005% or greater and 0.35% or less, Nb: 0.001% or greater and 0.10% or less, Ti: 0.001% or greater and 0.15% or less, B: 0.0002% or greater and 0.0050% or less, Sb: 0.001% or greater and 0.020% or less, Ca: 0.005% or less, V: 0.003% or greater and 0.05% or less, Cu: 0.005% or greater and 0.50% or less, Ni: 0.005% or greater and 0.50% or less, and Sn: 0.002% or greater and 0.50% or less, and Group B: at least one selected from the group consisting of Mg, Co, As, W, Pb, Ta, REMs, Cs, Ce, Zr, and Hf in a total amount of 0.01% or less.

3. The hot-pressed member according to claim 2, wherein, in the microstructure, the martensite is present in a volume fraction of 80% or greater.

4. The hot-pressed member according to claim 3, wherein the steel sheet has an aluminum or aluminum alloy coated layer or a zinc or zinc alloy coated layer on a surface.

5. The hot-pressed member according to claim 2, wherein the steel sheet has an aluminum or aluminum alloy coated layer or a zinc or zinc alloy coated layer on a surface.

6. The hot-pressed member according to claim 1, wherein, in the microstructure, the martensite is present in a volume fraction of 80% or greater.

7. The hot-pressed member according to claim 6, wherein the steel sheet has an aluminum or aluminum alloy coated layer or a zinc or zinc alloy coated layer on a surface.

8. The hot-pressed member according to claim 1, wherein the steel sheet has an aluminum or aluminum alloy coated layer or a zinc or zinc alloy coated layer on a surface.

9. A method for manufacturing a steel sheet for a hot-pressed member according to claim 1, the method comprising:
casting a slab having the chemical composition in a manner in which molten steel is maintained in a tundish for an average residence time of 10 minutes or more;
holding the slab at a temperature of 1200° C. or greater for 20 minutes or more and subsequently hot rolling the slab to form a hot rolled sheet;
cold rolling the hot rolled sheet to form a cold rolled sheet; and
annealing the cold rolled sheet at a temperature of an $Ac_1$ transformation temperature or greater.

10. The method for manufacturing a steel sheet for a hot-pressed member according to claim 9, further comprising forming an aluminum or aluminum alloy coated layer or a zinc or zinc alloy coated layer on a surface of the steel sheet formed by the annealing step.

11. A method for manufacturing a hot-pressed member according to claim 10, the method comprising:
heating the steel sheet for the hot-pressed member within a temperature range of an $Ac_3$ transformation temperature to 1000° C. for in a range of 30 to 600 seconds, and subsequently hot-pressing the steel sheet;
cooling the steel sheet in a manner in which an average cooling rate over a temperature range of an $Ar_3$ transformation temperature to 400° C. is greater than 50° C./s;
cooling the steel sheet to room temperature in a manner in which an average cooling rate over a temperature range of 400 to 100° C. is greater than 20° C./s; and
holding the steel sheet within a temperature range of 100 to 300° C. for in a range of 300 to 3600 seconds.

12. The method for manufacturing a hot-pressed member according to claim 11, wherein the average cooling rate over the temperature range of 400 to 100° C. is greater than 40° C./s.

13. A method for manufacturing a hot-pressed member according to claim 9, the method comprising:
heating the steel sheet for the hot-pressed member within a temperature range of an $Ac_3$ transformation temperature to 1000° C. for in a range of 30 to 600 seconds, and subsequently hot-pressing the steel sheet;
cooling the steel sheet in a manner in which an average cooling rate over a temperature range of an $Ar_3$ transformation temperature to 400° C. is greater than 50° C./s;
cooling the steel sheet to room temperature in a manner in which an average cooling rate over a temperature range of 400 to 100° C. is greater than 20° C./s; and
holding the steel sheet within a temperature range of 100 to 300° C. for in a range of 300 to 3600 seconds.

14. The method for manufacturing a hot-pressed member according to claim 13, wherein the average cooling rate over the temperature range of 400 to 100° C. is greater than 40° C./s.

15. A method for manufacturing a steel sheet for a hot-pressed member according to claim 2, the method comprising:
casting a slab having the chemical composition in a manner in which molten steel is maintained in a tundish for an average residence time of 10 minutes or more;
holding the slab at a temperature of 1200° C. or greater for 20 minutes or more and subsequently hot rolling the slab to form a hot rolled sheet;
cold rolling the hot rolled sheet to form a cold rolled sheet; and
annealing the cold rolled sheet at a temperature of an $Ac_1$ transformation temperature or greater.

16. The method for manufacturing a steel sheet for a hot-pressed member according to claim 15, further comprising forming an aluminum or aluminum alloy coated layer or a zinc or zinc alloy coated layer on a surface of the steel sheet formed by the annealing step.

17. A method for manufacturing a hot-pressed member according to claim 16, the method comprising:
heating the steel sheet for the hot-pressed member within a temperature range of an $Ac_3$ transformation temperature to 1000° C. for in a range of 30 to 600 seconds, and subsequently hot-pressing the steel sheet;
cooling the steel sheet in a manner in which an average cooling rate over a temperature range of an $Ar_3$ transformation temperature to 400° C. is greater than 50° C./s;
cooling the steel sheet to room temperature in a manner in which an average cooling rate over a temperature range of 400 to 100° C. is greater than 20° C./s; and
holding the steel sheet within a temperature range of 100 to 300° C. for in a range of 300 to 3600 seconds.

18. The method for manufacturing a hot-pressed member according to claim 17, wherein the average cooling rate over the temperature range of 400 to 100° C. is greater than 40° C./s.

19. A method for manufacturing a hot-pressed member according to claim 15, the method comprising:
heating the steel sheet for the hot-pressed member within a temperature range of an $Ac_3$ transformation temperature to 1000° C. for in a range of 30 to 600 seconds, and subsequently hot-pressing the steel sheet;
cooling the steel sheet in a manner in which an average cooling rate over a temperature range of an $Ar_3$ transformation temperature to 400° C. is greater than 50° C./s;
cooling the steel sheet to room temperature in a manner in which an average cooling rate over a temperature range of 400 to 100° C. is greater than 20° C./s; and
holding the steel sheet within a temperature range of 100 to 300° C. for in a range of 300 to 3600 seconds.

20. The method for manufacturing a hot-pressed member according to claim 19, wherein the average cooling rate over the temperature range of 400 to 100° C. is greater than 40° C./s.

* * * * *